Aug. 30, 1966 D. I. CROPP ETAL 3,269,819
METHOD OF ASSEMBLING A GLASS BEAD ON A WIRE
Filed April 13, 1964 2 Sheets-Sheet 1
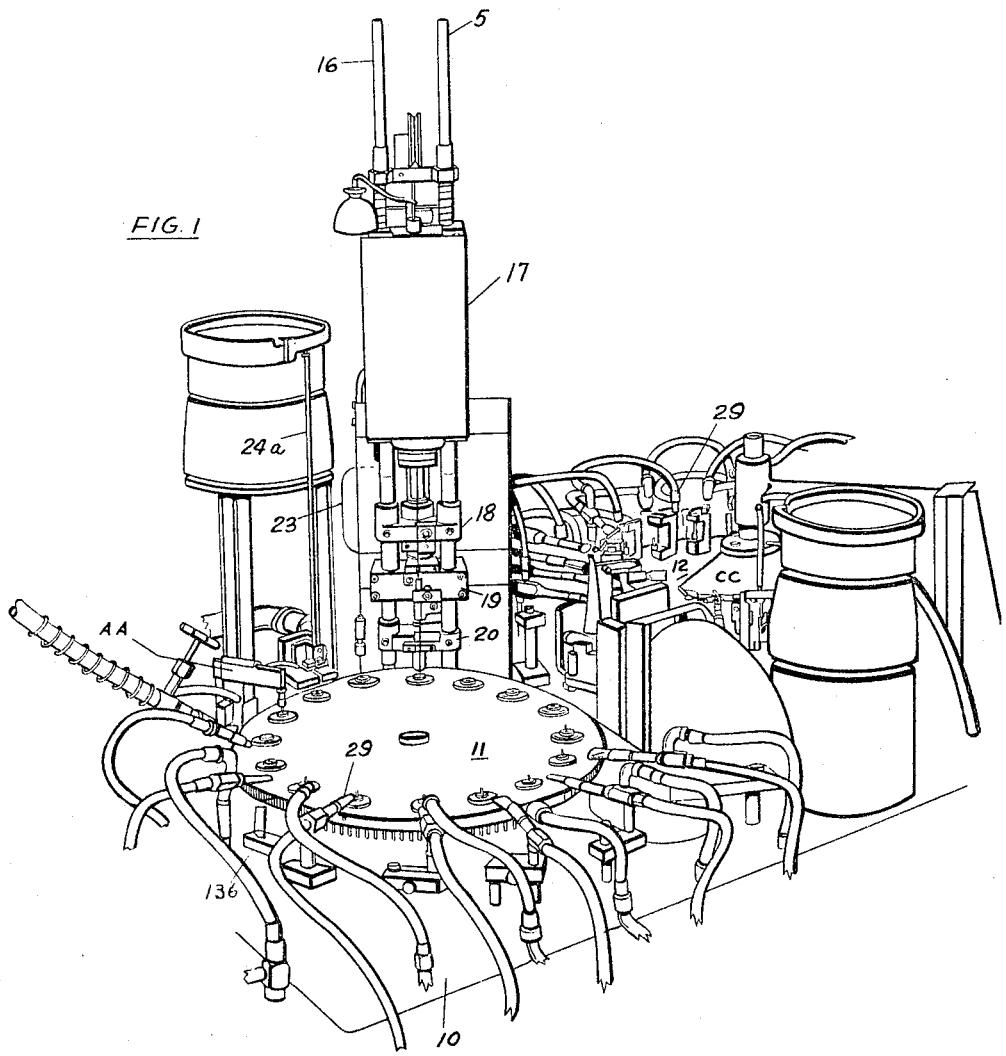
INVENTORS
DAVID I. CROPP
CHALMER C. JORDAN
ROBERT W. LINGO
BY Charles L. Lourcheck
attorney Aug. 30, 1966  D. I. CROPP ETAL  3,269,819
METHOD OF ASSEMBLING A GLASS BEAD ON A WIRE
Filed April 13, 1964  2 Sheets-Sheet 2
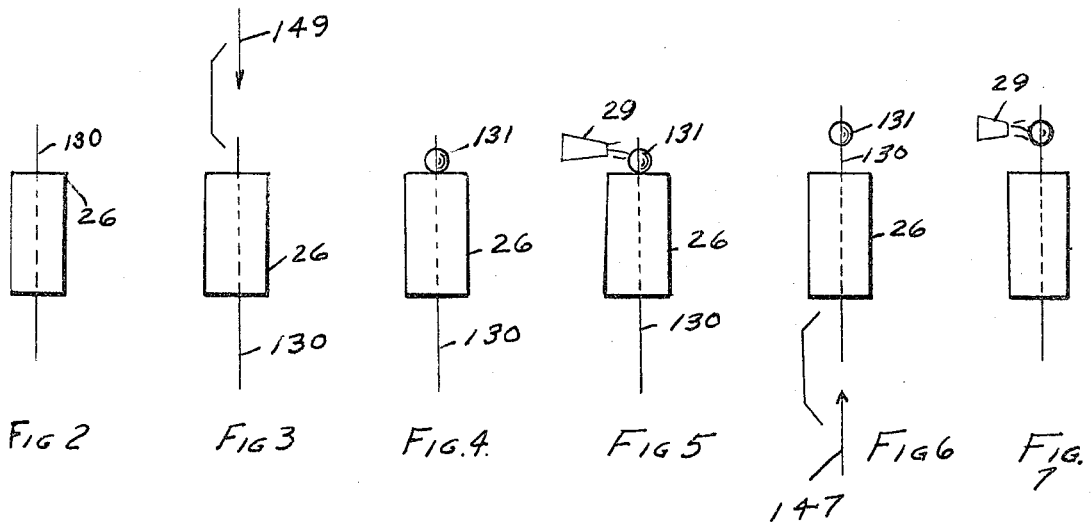
Inventors:
DAVID I. CROPP
CHALMER C. JORDAN
ROBERT W. LINGO
By: Charles L. Lovercheck United States Patent Office 3,269,819
Patented August 30, 1966

3,269,819
METHOD OF ASSEMBLING A GLASS BEAD ON A WIRE
David I. Cropp, 501 Chesnut St., Meadville, Pa., Chalmer C. Jordan, Perry Highway, Saegertown, Pa., and Robert W. Lingo, 901 Leslie Road, Meadville, Pa.
Filed Apr. 13, 1964, Ser. No. 359,174
1 Claim. (Cl. 65—59)

This application is a continuation-in-part of patent application, Serial No. 740,966, filed June 9, 1958, which issued as Patent No. 3,128,529 on April 14, 1964.

This invention relates to assembling machines and, more particularly, to machines for assembling parts including interfitting parts, such as semiconductor housings.

One of the elements of a semiconductor is made up of a wire and bead assembly made up of a small hollow cylindrical glass tube having a wire extending through the opening therethrough with a closure for one end of the tube.

In the preferred embodiment of the invention shown herein, the bead and wire assembly turret is made up of a flat plate like table having a top surface disposed in a horizontal plane and rotatable about a centrally disposed axis. An indexing device moves the table intermittently to bring each of sixteen turret heads located on the top surface adjacent the outer periphery thereof on the table successively into position under a wire measuring, cutting and loading station, a feed station at which glass beads are fed down onto the wire, and a plurality of tacking and heating stations where the bead is fused to the wire.

The wire is drawn from a spool of dumit wire of the type commonly used for transistors which is supported on the machine and carried down through a rotary wire straightener. Lengths of predetermined size are cut off of the wire and inserted into driven wire rotating assemblies in the spaced positions in the head and pushed down so that the upper end of the wire is located at a given level. The beads are oriented by means of a bowl type vibratory parts feeder and fed down a chute where they are threaded over the wire. The wire and bead then are heated and tacked to the wire. The wire is then lifted to a predetermined position and then cured by passing by a plurality of other stations.

It is an object of the invention to provide an improved method of attaching a bead to a wire.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is an isometric view of a machine according to the invention;

FIG. 2 is a schematic view of the wire rotating assembly showing the wire supported in it;

FIG. 3 is a view similar to FIG. 2, showing the wire pushed down to a predetermined position in the assembly;

FIG. 4 is a view similar to FIGS. 2 and 3, showing a bead on the wire;

FIG. 5 is a view similar to FIGS. 2 through 4 showing the bead tacked to the wire by a flame;

FIG. 6 shows the wire and bead tacked to it lifted from the wire rotating member; and FIG. 7 shows the bead and wire supported in the flame for sealing.

*General description of machine*

The machine is made up generally of a frame 10 supporting a wire and bead assembly turret 11 and a glass tube and bead assembly turret 12. The turrets 11 and 12 are fixed to axles 13 and 14, respectively, and connecting means is provided to selectively and intermittently rotate the turrets 11 and 12 about their respective axes and stop them at the respective loading, fusing, and sealing stations at predetermined intervals.

Two spaced, parallel, vertically extending columns 5 and 16 support a wire straightening mechanism 17, a wire measuring device 18, a clamp and cut-off 19, and a wire loader 20. The columns 5 and 16 are in turn themselves fixed to the frame 10 at their lower ends and support at their upper ends a guide sheave which guides dumit wire from a spool. The wire straightener 17 is rotated at a constant rate of speed by an electric motor.

Feeders shown may be of the type shown in Patent No. 2,609,914. The beads are fed to the assembling position on the turret 11 by means of the vibratory type bowl feeder shown of a well known design which feeds the beads in oriented position down a chute to their assembled position on the wire. Wire rotating assemblies 26 are supported at spaced positions adjacent the outer periphery of the bead loading turret 11.

Spaced gas burner jets 29 are attached to the frame 10 and disposed around the periphery of the bead loading turret 11. The gas jets 29 heat the glass and seal the beads to the wire.

The machine takes wire from the spool, the mechanism 17 straightens the wire, the wire is measured, cut, and loaded into the wire rotating assemblies 26, a bead 131 is down over the wire through feeder tubes 24a from the feeder. The wire is pushed down by the wire push down member A—A and is heated to tack the bead in place by the first burner and then pushed up by a member A to prevent heat damage to the bearings of the rotating assembly, and the wire is then indexed to each of the positions of the wire bead assembly turret 11, being heated to anneal it at each of the positions until it reaches the final position.

The wire is first fed into the wire rotating member 26 as indicated in FIG. 2. The wire 130 is then pushed down at a predetermined level by pushing down the mechanism 149 as indicated in FIG. 3, and a bead 131 is fed onto the wire as indicated in FIG. 4. The bead is then tacked by a gas flame as indicated at 29 in FIG. 5.

The wire push up 147 is shown in FIG. 6 and is for the purpose of pushing the wire 130 and bead 131 tacked thereto at the first station upward slightly so that the flames playing on the wire and beads at subsequent stations will not impinge on the bearings of the wire rotating mechanisms which might damage the bearings.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A method of assembling glass beads on wires comprising holding a wire in a support with a part of said wire extending above said support, placing a bead over said part of said wire that extends above said support with said bead disposed entirely above said support and in engagement with said support, rotating said wire with said bead thereon, heating said bead and thereby causing said bead to adhere to said wire and continuing to rotate said wire, lifting said wire with said bead thereon a predetermined amount to move said bead to a position spaced from said support, continuing rotation of said bead and said wire, and immediately applying a flame to said bead and thereby hermetically sealing said bead to said wire.

References Cited by the Examiner

UNITED STATES PATENTS

| | | | |
|---|---|---|---|
| 2,405,504 | 8/1946 | Juvinall et al. | 65—154 X |
| 2,482,119 | 9/1949 | Mickley | 65—43 |
| 2,718,095 | 9/1955 | Reiter | 65—140 |
| 2,950,574 | 8/1960 | Slater et al. | 65—57 X |

DONALL H. SYLVESTER, *Primary Examiner.*

F. W. MIGA, *Assistant Examiner.*